United States Patent [19]

Toba et al.

[11] Patent Number: 5,563,652

[45] Date of Patent: Oct. 8, 1996

[54] VIDEO CAMERA WITH ELECTRONIC PICTURE STABILIZER

[75] Inventors: Akira Toba, Osaka; Akio Kobayashi, Hirakata, both of Japan

[73] Assignee: Sanyo Electric Co., Ltd., Osaka, Japan

[21] Appl. No.: 266,536

[22] Filed: Jun. 27, 1994

[30] Foreign Application Priority Data

Jun. 28, 1993 [JP] Japan ........................... 5-156752
Jul. 29, 1993 [JP] Japan ........................... 5-187895
Oct. 20, 1993 [JP] Japan ........................... 5-262269

[51] Int. Cl.$^6$ ........................................... H04N 5/228
[52] U.S. Cl. ........................................... 348/208; 348/699
[58] Field of Search ........................................ 348/207, 208, 348/155, 699, 700; 354/70; H04N 5/228

[56] References Cited

U.S. PATENT DOCUMENTS

| 4,837,632 | 6/1989 | Kubo et al. ..................... 348/208 |
| 5,099,323 | 3/1992 | Morimura et al. .................. 348/208 |
| 5,237,405 | 8/1993 | Egussa et al. ..................... 348/208 |
| 5,349,415 | 9/1994 | Nishida ......................... 348/364 |
| 5,453,800 | 9/1995 | Kondo et al. ..................... 348/208 |

FOREIGN PATENT DOCUMENTS 61-201581  9/1986  Japan ............... H04N 7/137

*Primary Examiner*—Wendy Garber
*Assistant Examiner*—Tuan V. Ho
*Attorney, Agent, or Firm*—Armstrong, Westerman, Hattori, McLeland & Naughton

[57] ABSTRACT

A video camera including a motion detecting circuit in which correlative values of pixels at a present field are evaluated through the comparison of an image signal of a last field and an image signal of the present field. In the motion detecting circuit, an average correlative value and a minimum correlative value are further evaluated. A microcomputer determines whether or not these correlative values satisfy predetermined conditions for each of detection areas defined within an image field. A detection area which satisfies all the predetermined conditions becomes a valid detection area. A whole motion vector is detected by methods different from each other according to the number of the valid detection areas.

19 Claims, 7 Drawing Sheets

⟨ UP (U) ⟩

⟨ LEFT (L) ⟩ ⟨ MINIMUM (M) ⟩ ⟨ RIGHT (R) ⟩

⟨ DOWN (D) ⟩

VIDEO CAMERA WITH ELECTRONIC PICTURE STABILIZER

BACKGROUND OF THE INVENTION

1. Field of the Invention

The present invention relates to a video camera. More specifically, the present invention relates to a compact video camera with an electronic picture stabilizer, which is utilized as a camcorder, for example.

2. Description of the Related Art

One example of a method for detecting an unintentional motion component of an image sensing device is disclosed in, for example, the Twentieth Image Engineering Conference in 1989 by Matsushita Electric Industrial Corporation. In this prior art method, by utilizing a motion vector obtained by a representative point matching method disclosed in, for example, Japanese Patent Application Laid open No. 61(1986)-201581 [H04N 7/137], the motion component of the image sensing device is detected according to image information. In this prior art, an electronic picture stabilization is performed on the basis of a whole motion vector obtained from the image information.

More specifically, in this prior art, four detection areas are arranged in an image field, and four portion motion vectors are obtained from the image field. Then, the whole motion vector is evaluated by averaging the portion motion vectors of the four detection areas, or the whole motion vector is evaluated by averaging portion motion vectors of two portion motion vectors having intermediate values of the four portion motion vectors, whereby the electronic picture stabilizer is performed on the base of the whole motion vector thus evaluated.

However, in such a method, in a case where an object has passed through a detection area, for example, when there is a detection area in which a portion motion vector which is not caused by the unintentional motion of the camera is detected, the whole motion vector is affected by this detection area, and therefore, the motion of the camera is not accurately detected, and thus, electronic picture stabilization cannot be performed with precision.

SUMMARY OF THE INVENTION

Therefore, a principal object of the present invention is to provide a video camera having a novel electronic picture stabilizer.

Another object of the present invention is to provide a video camera with an electronic picture stabilizer capable of accurately performing the electronic picture stabilization.

In a video camera according to the present invention, valid detection area determinating means includes first means for evaluating correlative values of pixels at a present field or frame on the basis of an image signal of a last field or frame and an image signal of the present field or frame; means for evaluating an average correlative value that is a mean value of the correlative values; means for evaluating a minimum correlative value that is a minimum value out of the correlative values; means for evaluating a value obtained by dividing the average correlative value by the minimum correlative value; means for evaluating a gradient associated with the minimum correlative value; and means for determining whether or not a motion vector is correctly detected in accordance with whether or not all of the following conditions are satisfied:

(A) the average correlative value>a first threshold value;

(B) the value obtained by dividing the average correlative value by the minimum correlative value>a second threshold value;

(C) the gradient>a third threshold value (when the average correlative value≧a fifth threshold value); and (D) the gradient>a fourth threshold value (when the average correlative value<the fifth threshold value), the third threshold value being equal to or larger than the fourth threshold value (the third threshold value≧the fourth threshold value).

As indicated in the above described conditions (C) and (D), the threshold values to be compared with the gradient are changed in accordance with the average correlative value. When a contrast in a screen is large, that is, when the average correlative value is large, the threshold value to be compared with the gradient is set to be large as indicated by the condition (C), and when the contrast in the screen is small, that is, when the average correlative value is small, the threshold value to be compared with the gradient is set to be small as indicated by the condition (D). Therefore, the gradient can be compared with the threshold value in corresponding to a change of the contrast in the screen (the third threshold value or the fourth threshold value), and therefore, determination whether or not an object having repeated pattern exists in the image field is performed more accurately.

Then, it is determined whether or not each of respective detection areas defined within the screen image field is a valid detection area by the valid detection area determinating means through determination whether or not all of the above described conditions are satisfied in respect to the detection area.

In a case where the number of the valid detection areas is larger than a predetermined threshold value, first, a first absolute value and a second absolute value are evaluated for each detection area by first calculation means and second calculation means, respectively. By adding the first absolute value and the second absolute value to each other for each detection area by addition means so as to obtain a first dispersion, and the arbitrary number of the first dispersions are selected by selection means in order of small. A whole motion vector is detected on the basis of portion motion vectors of the detection areas representing the selected first dispersions.

When the number of the valid detection areas is less than the predetermined value, first, a portion motion vector of an arbitrary invalid detection area is replaced with the whole motion vector of a field or frame before the present field or frame by first replacement means. Thereafter, the portion motion vector of the invalid detection area that is replaced with the whole motion vector and the portion motion vectors of the valid detection areas are utilized for detecting the whole motion vector at the present field or frame according to the above described processing.

Furthermore, the number of valid detection areas is zero, as the whole motion vector of the present field or frame, a resulted vector by multiplying the whole motion vector evaluated one field or frame before by a predetermined coefficient less than 1 (decimal number less than 1) is utilized.

In accordance with the present invention, since a detecting method for detecting the whole motion vector is changed according to the number of valid detection areas, even if a portion motion vector that is not caused by the unintentional motion of the camera is detected in performing the electronic image stabilization, the influence thereof becomes very small, and therefore, it becomes possible to accurately detect an unintentional motion amount. Therefore, the unintentional motion of the camera can be corrected with precision.

It is correctly determined whether or not the object having repeated pattern (stripe or the like) exists in the image, and a detection area is hardly determined as an invalid detection area even when the contrast in the screen is slightly reduced, and therefore, a detection accuracy of the motion vector is increased.

Furthermore, the whole motion vector may be evaluated on the basis of a second dispersion. More specifically, first, the second dispersion is evaluated by second dispersion calculation means by utilizing an average vector of the portion motion vectors which is evaluated by averaging means, and the portion motion vectors of the respective detection areas. A fact that the second dispersion is large indicates that variation of the portion motion vectors is large. This tendency occurs in a case where there is an object which moves in only a portion of the screen. On the other hand, a fact that the second dispersion is small means that the variation of the portion motion vectors is small. This tendency occurs in a case where no moving object exists on the screen, or a case where there is an object which moves all over the screen.

Therefore, if the whole motion vector by utilizing the portion motion vector of the case where the second dispersion is large, the whole motion vector having low reliability is obtained. In contrast, if the whole motion vector is evaluated by utilizing the portion motion vector of the case whether the second dispersion is small, a whole motion vector having high reliability is obtained. Therefore, in the case where the second dispersion is large, a value of the whole motion vector is made small by multiplying the average vector of the portion motion vectors by a small coefficient. Furthermore, in the case where the second dispersion is small, a value of the whole motion vector is made large by multiplying the average vector of the portion motion vectors by a large coefficient. That is, the whole motion vector of the case of the large second dispersion is not used as possible, and in contrast, the whole motion vector of the case of the small second dispersion is used if possible.

In addition, a degree of a magnitude of the second dispersion is determined by comparing means, and the whole motion vector is detected in accordance with a comparison result.

In accordance with the present invention, by grasping a status of the screen through evaluation of the second dispersion, the whole motion vector is detected in accordance with the magnitude of the second dispersion, and therefore, it is possible to more correctly detect the whole motion vector. Accordingly, the unintentional motion amount can be detected with precision.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
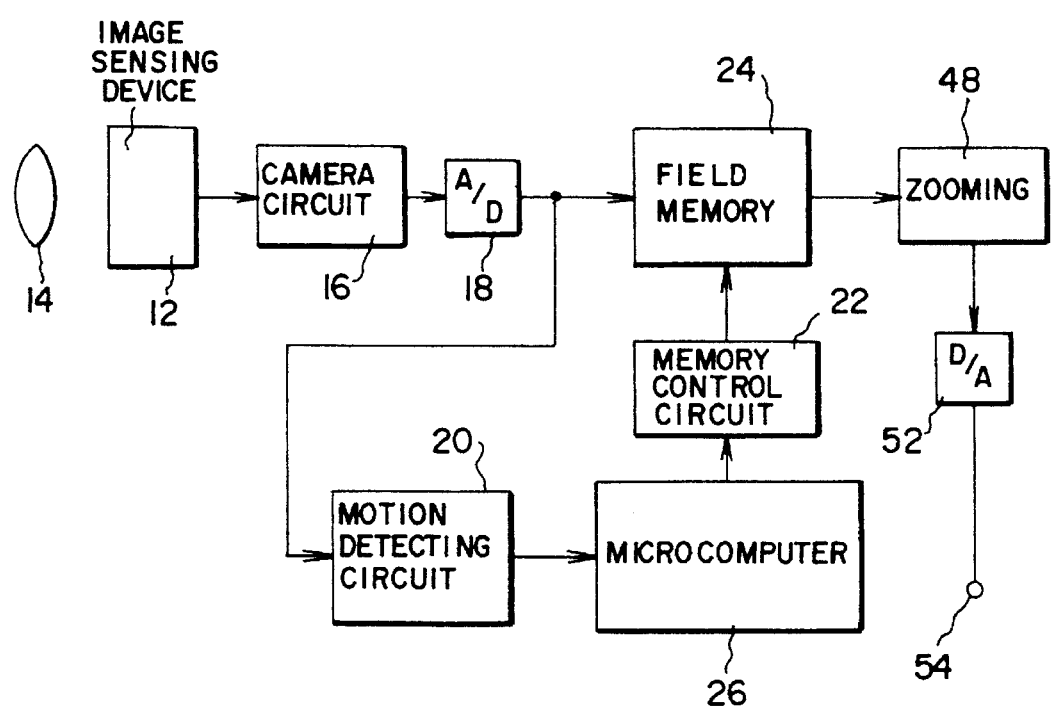
FIG. 1 is a block diagram showing one embodiment according to the present invention.

A video camera 10 of a preferred embodiment shown in FIG. 1 includes a solid-state image sensing device 12 such as a CCD (Charge-Coupled Device) which converts an optical signal being inputted from an object (not shown) through a lens 14 into an electrical signal. The electrical signal from the solid-state image sensing device 12 is inputted to a camera circuit 16. As is well known, the camera circuit 16 includes a sample-hold circuit by which the electrical signal from the solid-state image sensing device 12 is sampled and held. A level of the electrical signal thus sampled and held is adjusted by an AGC (Automatic Gain Control), and synchronization signals are added to the electrical signal by a synchronization signal adding circuit (not shown). Thus, the camera circuit 16 converts the electrical signal from the solid-state image sensing device 12 into an analog video signal. The analog video signal is further converted into a digital video signal by an A/D converter 18. The digital video signal is applied to a motion detecting circuit 20. As the motion detecting circuit 20, for example, an LSI "L7A0948" manufactured by Sanyo Electric Co., Ltd., an assignee of the present invention, may be utilized. Under control of a memory control circuit 22 which is included in the same LSI constituting the motion detecting circuit 20, the digital video signal is written into a field memory 24 field-by-field.

Figure 3:
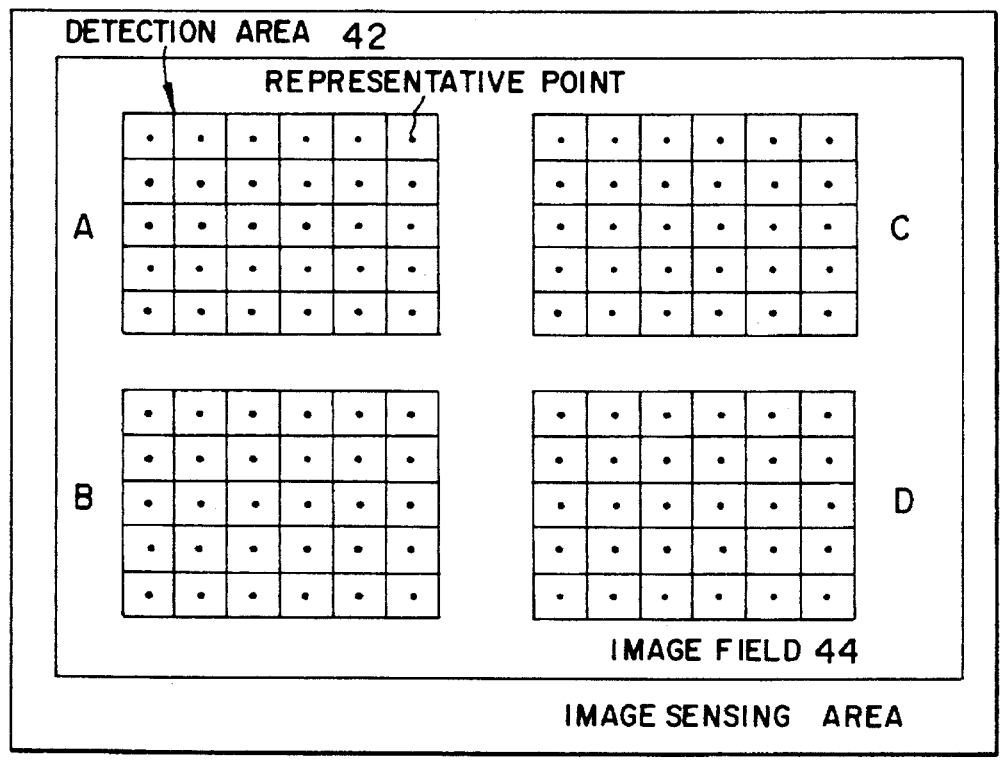
FIG. 3 is an illustrative view showing a principle of an electronic zooming and detection areas within an image field.

The motion detecting circuit 20 evaluates, for each of four detection areas A, B, C and D shown in FIG. 3, a position of one point having a highest correlation degree (a minimum correlative value) and positions of four points around the one point, and correlative values by utilizing a well-known representative point matching method. The position data and the correlative value data are applied to a microcomputer 26.

Figure 2:
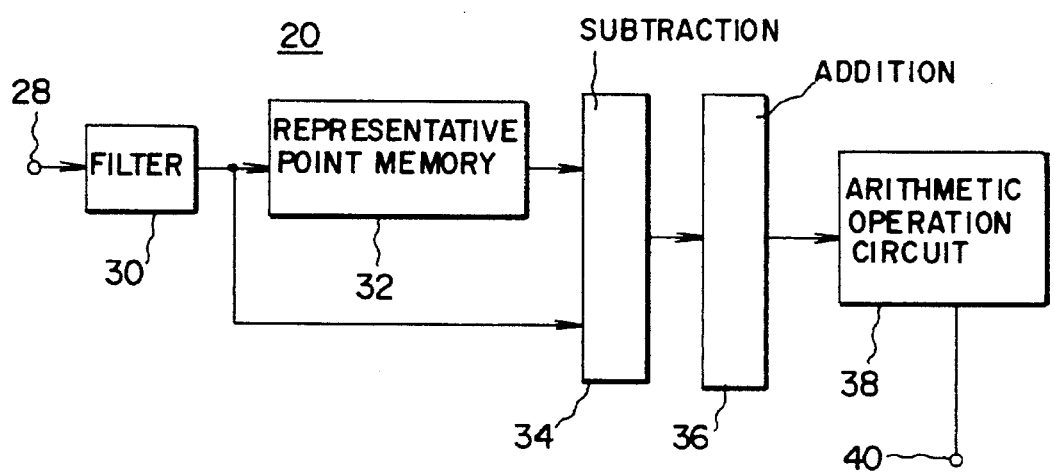
FIG. 2 is a block diagram showing a motion detecting circuit of FIG. 1 embodiment.
Figure 4:
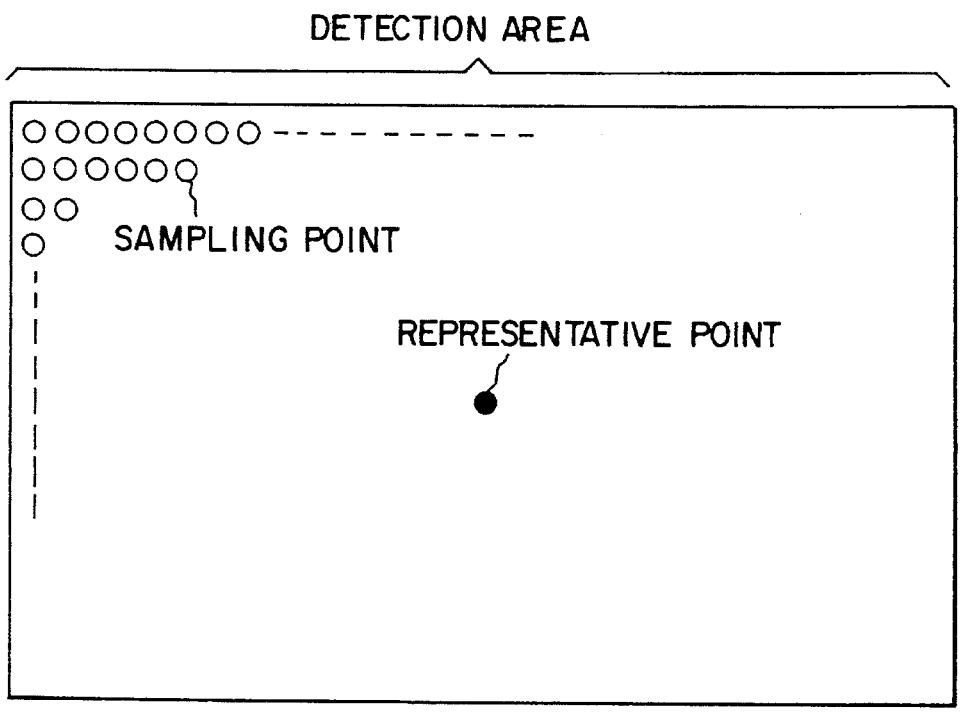
FIG. 4 is an illustrative view showing a principle of the electronic zooming and representative points and sampling points in the detection areas.

More specifically, referring to FIG. 2, the motion detecting circuit 20 shown in FIG. 1 includes an input end 28 which receives the digital video signal from the A/D converter 18. The digital video signal inputted to the input end 28 is applied to the representative point memory 32 and a subtracting circuit 34, respectively, through a filter 30. The filter 30 is a digital low-pass filter which is utilized for improvement of an S/N ratio so as to secure a significant detection accuracy with a lesser number of representative points. The representative point memory 32 stores position data and luminance data of a plurality of representative points within each of the respective detection areas A–D shown in FIG. 3. In the embodiment shown, each of the detection areas is divided into thirty (30) regions, and therefore, thirty (30) representative points are determined, and accordingly, the representative point memory 32 stores the position data and the luminance data of the thirty (30) representative points. Each of the divided regions 42 (FIG. 4) is constituted by 32 pixels in a horizontal direction (X direction)×16 pixels in a vertical direction (Y direction).

The subtracting circuit 34 executes subtracting operations of the luminance data of the representative point of the last field read-out the representative point memory 32 and luminance data of all the pixels of the present field applied from the input end 28 via the filter 30, and obtains absolute values of subtraction results. That is, the subtracting circuit 34 evaluates a luminance difference between the luminance data of the present field and the luminance data of the last field, and applies the luminance differences to an accumulating and adding circuit 36. The accumulating and adding circuit 36 executes an accumulation and addition of the luminance differences of thirty (30) in this embodiment obtained by the subtracting circuit 34 of the same position or pixel in the same region 42 so as to output correlative values data. The correlative values data is applied to an arithmetic operation circuit 38 which evaluates a minimum correlative value and calculates an average correlative value for each of the detection areas A–D, and evaluates position data of the pixel having the minimum correlative value. Data of the minimum correlative value, average correlative value and positions thus obtained by the arithmetic operation circuit 38 is applied to the above described microcomputer 26 from an output end 40. In addition, such arithmetic operations for the correlative values can be performed by the above described LSI "L7A0948".

Then, in the microcomputer 26, a motion vector of a whole of a screen, i.e. the image field 44 (FIG. 3) (simply called as "whole motion vector") is calculated on the basis of the position data and the correlative value data.

First, a deviation of a pixel indicative of the minimum correlative value from the representative point is evaluated on the basis of the position data of that pixel, and the deviation is made as a portion motion vector. In addition, in order to provide accurate detection of the portion motion vector, an internal interpolation is performed by utilizing the correlative values of the four pixels around the pixel having the minimum correlative value so as to calculate the position data of the pixel having the minimum correlative value.

In addition, the microcomputer 26 further evaluates a propriety of the portion motion vector detected for each detection area, that is, determines whether each of the detection areas is a valid detection area or an invalid detection area on the basis of the status of the image. In the embodiment shown, since the representative point matching method is utilized, the change of the correlative value with respect to the coordinate positions becomes similar to FIG. 11 (described later).

Now, in order to determine whether or not the contrast of the screen is low; whether or not there is a moving object in the detection area; and whether or not there is an object having a repeated pattern (stripes, for example) in the detection area, conditions (A)–(C) are defined as follows.

(A) average correlative value>$\alpha$;

(B) value obtained by dividing average correlative value by minimum correlative value>$\beta$;

(C) gradient>$\gamma$ (when average correlative value$\geq\epsilon$); and (D) gradient>$\delta$ (when average correlative value<$\epsilon$);

In addition, $\alpha$, $\beta$, $\gamma$, $\delta$, and $\epsilon$ are constant threshold values, and $\gamma\geq\delta$. For example, the threshold values are set as $\alpha=36$, $\beta=7$, $\gamma=8$, $\delta=4$, and $\epsilon=128$.

The microcomputer 26 determines whether or not the contrast of the screen is low in accordance with the above described condition (A). The microcomputer 26 further determines whether or not the moving object exists within the detection area on the basis of the above described condition (B). Furthermore, the microcomputer 26 determines whether or not the object having a repeated pattern exists in the detection area on the basis of the above described condition (C) at a timing that the average correlative value is equal to or larger than the threshold value $\epsilon$, or the above described condition (D) at a time that the average correlative value is smaller than the threshold value $\epsilon$. These processings are executed for each of the detection areas A–D so that it is determined whether or not the portion motion vector of each of the detection areas A–D is erroneously detected due to the moving object or the like other than unintentional motion and thus reliable, that is, whether or not each of the detection areas A–D is the valid detection area. If a detection area satisfies all the above described conditions (A)–(D), the detection area is determined to be the valid detection area, and if any one of the above described conditions is not satisfied, the detection area is determined to be an invalid detection area.

Determining, whether or not the detection area is the valid detection area is as follows:

At first, when the contrast of the screen is low, the luminance difference is small, and therefore, the correlative value becomes small. When the entire screen is white, for example, the correlative value is very small. In such a case, the reliability of the detection result is small, and therefore, only when the condition (A) is satisfied, that is, the average correlative value>$\alpha$, the detection area is determined as the valid detection area. In addition, the threshold value $\alpha$ can be determined through field tests or examinations. Thus, on the basis of the average correlative value, it is determined whether or not the screen is low contrast.

Furthermore, when the moving object exists in the detection area, the correlative value at a portion occupied by the moving object and the correlative value when no moving object exists are different from each other. Various kinds of correlative values are obtained by the portion occupied by the moving object, and the correlative value from that portion becomes a large value generally (the correlation degree becomes low). Therefore, when the moving object exists within the detection area, there is a possibility that the minimum correlative value becomes large, and the portion motion vector of that detection area may be erroneously detected. If the portion motion vector is erroneously detected, the whole motion vector is also erroneously detected; however, when the average correlative value is large, the portion motion vector is reliable even if the minimum correlative value is large at some extent. On the other hand, when the average correlative value is small, the portion motion vector is reliable only when the minimum correlative value is smaller. Therefore, the detection area is determined as the valid detection area when (the average correlative value/the minimum correlative value)>7, and if this condition is not satisfied, the portion motion vector of the detection area is not utilized so as to avoid the influence due to the above described erroneous detection. Thus, the microcomputer 26 determines the presence or absence of the moving object by evaluating the value of the average correlative value/the minimum correlative value.

Furthermore, in the microcomputer 26, one point having the minimum correlative value and the correlative values of four points around the one point are utilized so as to detect the object having repeated pattern (stripes, for example).

Figures 5, 11:
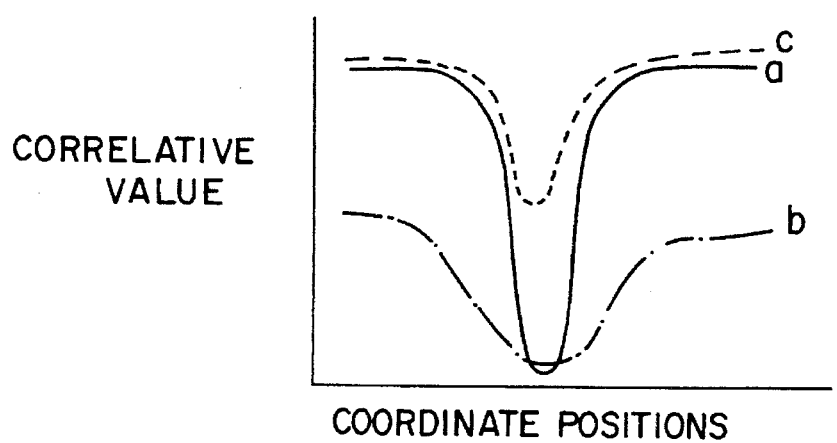
FIG. 5 is an illustrative view showing a method for detecting an object having repeated pattern by utilizing a pixel having a minimum correlative value and four pixels around the same.
FIG. 11 is a graph showing a change of correlative values in respect to coordinate positions for each image status in a case where the representative point matching method is utilized.

More specifically, on the assumption that the minimum correlative value is M, and the correlative values of the four points at left, right, up, and down are L, R, U, and D as shown in FIG. 5. The differences between the respective correlative values, i.e. L–M, R–M, U–M and D–M are calculated, and a minimum value of the differences is defined as the gradient. When the average correlative value is equal to or larger than the threshold value $\epsilon$, the gradient is compared with the threshold value $\gamma$ that is determined through field tests. Then, if the gradient is larger than the threshold value $\gamma$, it is determined that the detection area is the valid detection area, and if the gradient is equal to or smaller than the threshold value $\gamma$, the detection area is determined as the invalid detection area. On the other hand, when the average correlative value is smaller than the threshold value $\epsilon$, the gradient is compared with the threshold value $\delta$ that is determined through field tests. If the gradient is larger than the threshold value $\delta$, the detection area is determined as the valid detection area, and if the gradient is equal to or smaller than the threshold value $\delta$, it is determined that the detection area is the invalid detection area.

Thus, in accordance with the conditions (A)–(D), it is determined whether or not each of the detection areas is the valid detection area.

Then, in accordance with the number of valid detection areas, the motion amount between the fields, i.e. the whole motion vector is determined. Therefore, the whole motion vector is representative of the amount of motion between the fields and a direction thereof.

The whole motion vector thus evaluated is applied to the memory control circuit 22. In the memory control circuit 22, a start address for reading-out the field memory 24 is determined on the basis of the whole motion vector, and therefore, the digital video signal stores in the field memory 24 becomes to be read-out at the start address. That is, the memory control circuit 22 moves an extracting area 46 (FIG. 6) formed by the digital video signal from the field memory 24 in accordance with the whole motion vector calculated by the microcomputer 26.

In addition, since the extracting area 46 cannot be moved by the digital video signal read-out from the field memory 24 as it is, an electronic zooming circuit 48 (FIG. 1) is utilized.

Figure 6:
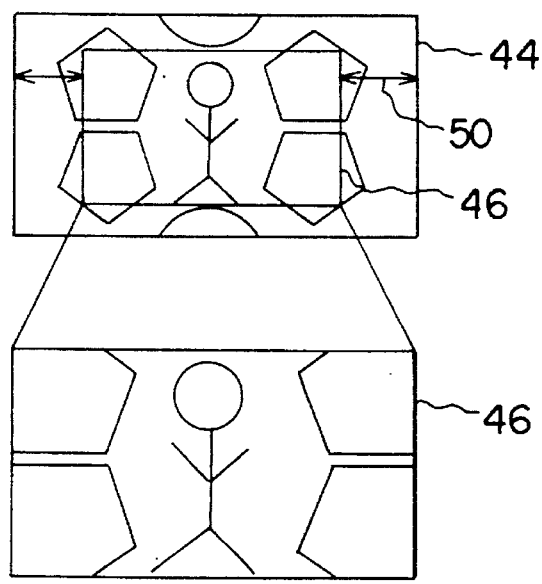
FIG. 6 is an illustrative view showing a principle of an electronic picture stabilization.

With reference to FIG. 6, the electronic zooming circuit 48 (FIG. 1) defines the image extracting area 46 wherein an image is enlarged according to a zooming magnification with respect to the image field 44. A position of the image extracting area 46 can be freely moved within a range of the image field 44 by changing the start address for reading-out the digital video signal from the field memory 24. Then, in order to obtain a video signal for a whole area of the image field 24 on the basis of the digital video signal extracted from the image extracting area 46, an image is enlarged by utilizing an internal interpolation on the basis of the digital video signal read-out the field memory 24.

Thus, by zooming-up an image of an arbitrary image extracting area 46 within the image field 44 in an electronic manner by the electronic zooming circuit 48 (FIG. 1), a correctable range 50 that is equal to a difference between the image field 44 and the image extracting area 46 can be formed.

Figure 7:
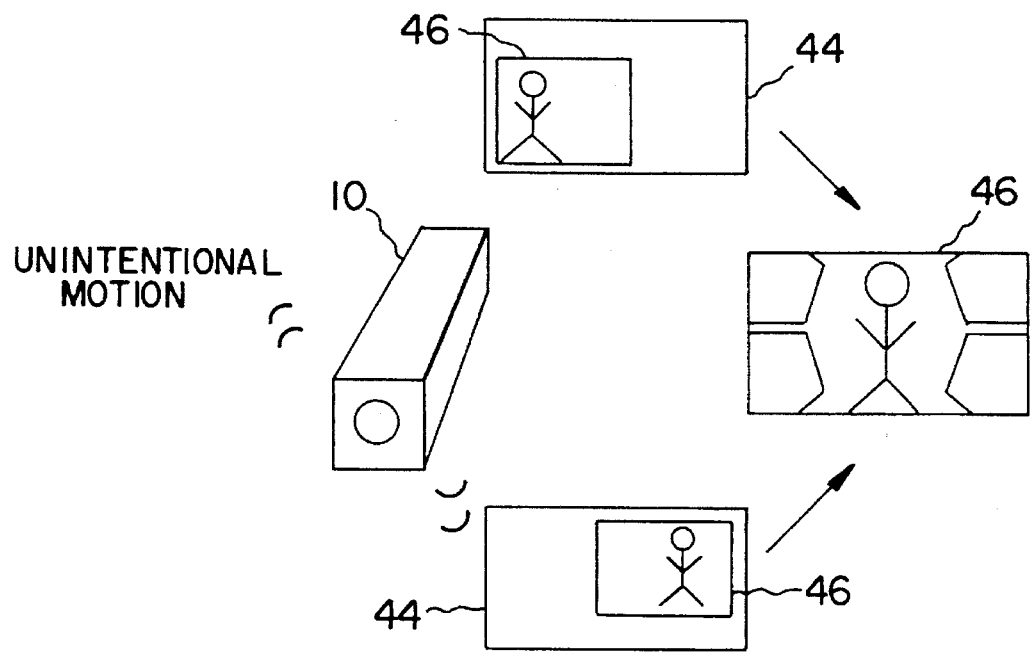
FIG. 7 is an illustrative view showing the detection areas within the image field, to which a representative point matching method is applied.

If an unintentional motion occurs in the video camera 10 as shown in FIG. 7 according to a vibration of a hand of a person who operates the video camera 10, an image from the video camera 10 is blurred, resulting in a case where an object person exists in a left-lower portion within the image field 44 (shown at an upper portion in FIG. 7) or a case where an object person exists at a right-upper portion within the image field (shown at a lower portion in FIG. 47. Therefore, by moving the image extracting area 46 at every field according to the whole motion vector that is calculated by the microcomputer 26, as shown at a right portion in FIG. 7, the object person can be just positioned in the image extracting area 46.

The digital video signal thus outputted from the electronic zooming circuit 48 is converted into an analog signal by a D/A converter 52 so as to be outputted from an output terminal 54.

In addition, the processing set forth in the following may be executed by the microcomputer 26.

At first, the microcomputer 26 evaluates a mean value of four portion motion vectors (average vector) and a mean value of portion motion vectors of the valid detection areas, respectively.

Then, a dispersion is calculated by the microcomputer 26. A degree of variation of the portion motion vector of each of the detection areas is evaluated according to the dispersion. The dispersion is represented by the following equations.

X direction dispersion=$\Sigma$ (|X direction portion motion vectors of detection areas–X direction average vector|)/the number of the detection areas; and Y direction dispersion=$\Sigma$ (|Y direction portion motion vectors of detection areas–Y direction average vector|)/the number of the detection areas wherein, the X direction portion motion vector indicates an X direction component of the portion motion vector, and the Y direction portion motion vector indicates a Y direction component of the portion motion vector, and the X direction average vector indicates an X direction component of the average vector, and the Y direction average vector indicates a Y direction component of the average vector.

In accordance with the dispersion as described later, a dispersion coefficient Hk is determined, and by multiplying the dispersion coefficient Hk by the mean value of the portion motion vectors of the valid detection areas, the whole motion vector is calculated. In addition, that the dispersion coefficient Hk is determined in the X direction and the Y direction, respectively, and the X direction dispersion coefficient is multiplied to the X direction component of the mean value of the portion motion vectors of the valid detection areas, and the Y direction dispersion coefficient is multiplied to the Y direction component of the mean value of the portion motion vectors.

(1) 0$\leq$dispersion<8: Hk=1
(2) 8$\leq$dispersion<16: Hk=0.75
(3) 16$\leq$dispersion<24: Hk=0.5
(2) 24$\leq$dispersion<32: Hk=0.25

In addition, in a case where the dispersion exceeds "32", a minimum one of the four portion motion vectors is defined as the whole motion vector.

Thus, if there is a valid detection area, the whole motion vector is calculated by multiplying the dispersion coefficient Hk to the mean value of the portion motion vectors of the valid detection areas; However, if there is no valid detection area, the whole motion vector is defined as "the whole motion vector of the present field$\times$a coefficient less than 1".

In addition, as the coefficient less than 1, in the embodiment shown, "0.97" is utilized.

In addition, a reason why the dispersion coefficient is set stepwise in accordance with the magnitude of the dispersion is as follows:

A fact that the dispersion is large indicates that the variation of the each of respective portion motion vectors is large. This tendency occurs in a case where a moving object exists at only a portion of the screen. On the other hand, a fact that the dispersion is small indicates that the variation of each of the respective portion motion vectors is small. This tendency occurs in a case where no moving object exists in the screen, or a case where a moving object which moves all over the screen exists.

Therefore, if the whole motion vector is evaluated by utilizing the portion motion vectors of a case where the dispersion is large, the whole motion vector having low reliability is obtained. On the other hand, if the whole motion vector is evaluated by utilizing the portion motion vectors of a case where the dispersion is small, the whole motion vector having high reliability is obtained. Accordingly, when the dispersion is large, the whole motion vector is made smaller by multiplying a small dispersion coefficient Hk to the mean value of the portion motion vectors. Furthermore, when the dispersion is small, by multiplying a large dispersion coefficient Hk to the mean value of the portion motion vectors, the whole motion vector is made larger. That is, the whole motion vector of the case where the dispersion is large is not used as possible, and in contrast, the whole motion vector of the case where the dispersion is small is used if possible, so that the whole motion vector having high reliability can be obtained.

By utilizing the whole motion vector thus obtained, in accordance with the above described manner, the unintentional motion is corrected, that is, the electronic picture stabilization is performed.

With referring FIG. 8 to FIG. 10, a major operation in the microcomputer 26 of the video camera 10 will be described. In addition, in a flowchart of FIG. 8, "n" ("1" to "4") is corresponding to the detection area A to the detection area D.

Figure 8:
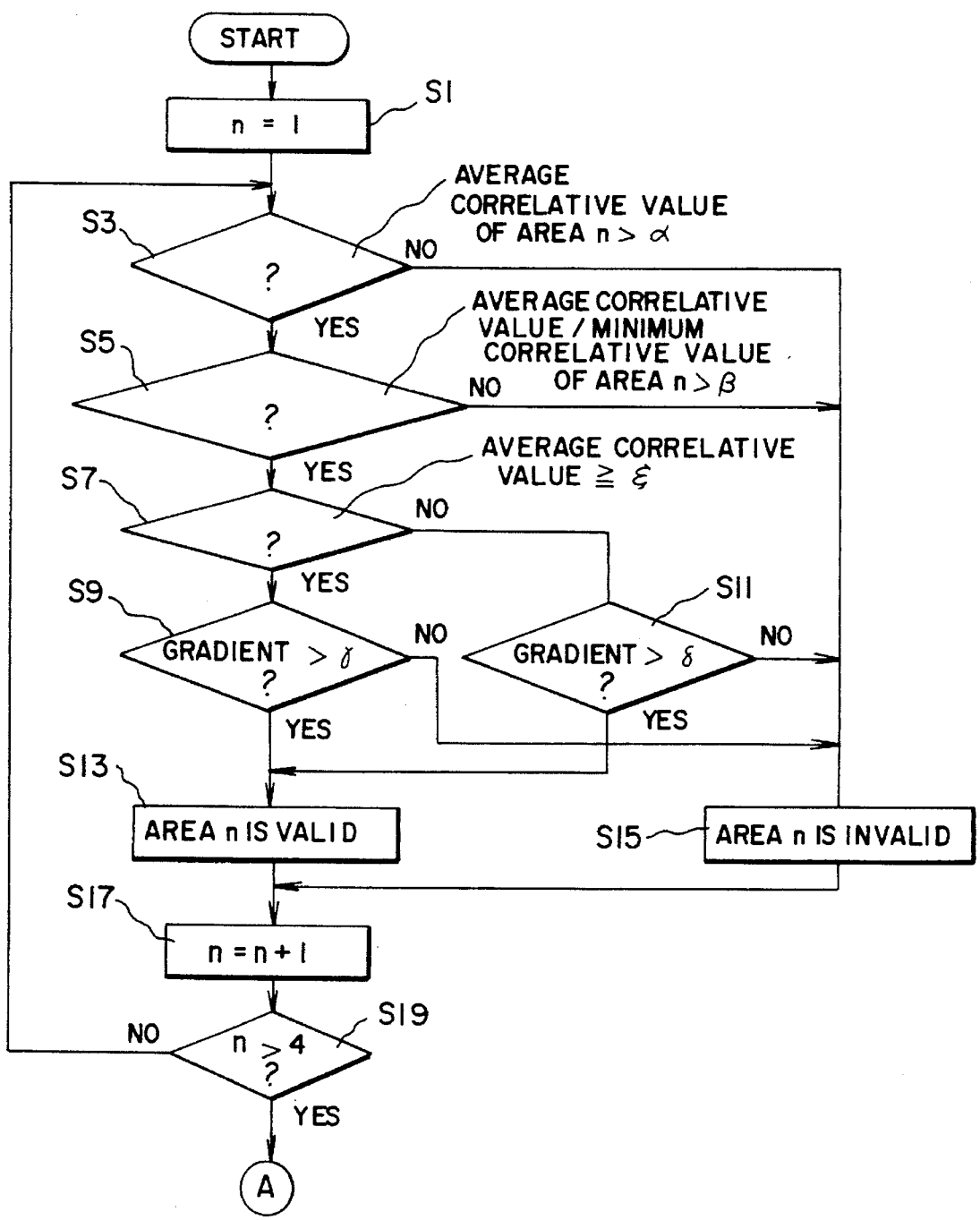
FIG. 8 is a flowchart showing an operation of the embodiment.

In a step S1 shown in FIG. 8, "n" of the detection area is initially set as "1". If the average correlative value of the detection area n is larger than the threshold value α in a step S3, the process proceeds to a step S5 wherein it is determined whether or not the value obtained by dividing the average correlative value by the minimum correlative value is larger than the threshold value β. If the value is larger than the threshold value β in the step S5, in a step S7, it is determined whether or not the average correlative value is equal to or larger than the threshold value ε. If the average correlative value is equal to or larger than the threshold value ε, in a step S9, it is determined whether or not the gradient of the detection area n is larger than the threshold value γ. If "YES" is determined in the step S9, in a step S13, the detection area n is determined as a valid detection area. On the other hand, if the average correlative value is smaller than the threshold value ε in the step S7, in a step S11, it is determined whether or not the gradient of the detection area n is larger than the threshold value δ. If "YES" is determined in the step S11, in a step S13, the detection area n is determined to be a valid detection area.

At a time that the average correlative value of the detection area n is equal to or smaller than the threshold value α in the step S3, a time that the value obtained by dividing the average correlative value of the detection area n by the minimum correlative value is equal to or smaller than the threshold value β in the step S5, a time that the gradient of the detection area n is equal to or smaller than the threshold value γ in the step S9, or a time that the gradient of the detection area n is equal to or smaller than the threshold value δ in the step S11, the process proceeds to a step S15 in which, the detection area n is determined as an invalid detection area.

After the step S13 or the step S15, in a step S17, "n" indicative of the detection area is incremented by 1. Then, in a step S19, it is determined whether or not "n" is equal to or smaller than "4", and if "YES", the process returns to the step S3. That is, the above described processings are repeated until "n" exceeds "4" in the step S19. If "n" exceeds "4" in the step S19, the process proceeds to a step S21 shown in FIG. 9.

In the step S21, the number of the valid detection areas is counted. In a step S23, it is determined whether or not the number of the valid detection areas is "4", and if "NO", in a step S25, it is determined whether or not the number of the valid detection areas if "3". If "YES" is determined in the step S23 or the step S25, that is, if the number of the valid detection areas is more than "3", in a step S27, mean values are calculated of the X (horizontal, for example) direction portion motion vectors and the Y (vertical, for example) direction portion motion vectors are calculated for each of the valid detection areas. Then, in a step S29, by utilizing the mean values calculated in the step S27, an absolute value of the X direction and an absolute value of the Y direction are evaluated for each of the valid detection areas, and then, the X direction absolute value and the Y direction absolute value are added to each other for each detection area to obtain the dispersion. The X direction absolute value is an absolute value of a difference between the X direction portion motion vectors of the respective detection areas and the mean value of the X direction portion motion vectors of the valid detection areas. Furthermore, the Y direction absolute value is an absolute value of a difference between the Y direction portion motion vectors of the respective detection areas and the mean value of the Y direction portion motion vectors of the valid detection areas. Then, in a step S31, two dispersions having smaller values are selected from the four dispersions calculated in the step S29, and a mean value of the portion motion vectors of the detection areas corresponding to the selected dispersions is calculated. Then, in a step S33, the mean value is used as the whole motion vector.

On the other hand, if "NO" is determined in the step S25, in a step S35, it is determined whether or not the number of the valid detection areas is "2". If the number of the valid detection areas is "2", in a step S37, the portion motion vector of an arbitrary one of the invalid detection areas is replaced with the whole motion vector evaluated before one field, and then, the process proceeds to the step S27. Then, through the execution of the steps S27–S33, the whole motion vector is determined. In this embodiment shown, the portion motion vector of one of the two invalid detection area is replaced by the whole motion vector of the last field, but the portion motion vector of the remaining invalid detection area is not replaced with the whole motion vector. Therefore, the whole motion vector is determined on the basis of the portion motion vectors of the two valid detection areas and the portion motion vector of the invalid detection area being replaced with the whole motion vector.

If it is determined that the number of the valid detection areas is not "2" in the step S35, in a step S39, it is determined whether or not the number of the valid detection areas is "1". If "YES" is determined in the step S39, in a step S41, the portion motion vectors of arbitrary two invalid detection areas are replaced with the whole motion vector evaluated one field before and the whole motion vector evaluated two fields before, respectively, and the process proceeds to the step S27. Then, through the execution of the steps S27–S33, the whole motion vector can be evaluated. In this embodiment shown, the portion motion vectors of the two invalid detection areas out of the three invalid detection areas are replaced with the whole motion vector evaluated one field before and the whole motion vector evaluated two field before, respectively, and for the remaining one invalid detection area, the portion motion vector is not replaced with the whole motion vector. Therefore, in this embodiment shown, the whole motion vector is determined on the basis of the portion motion vector of one valid detection area and the portion motion vectors of the two invalid detection area being replaced with the whole motion vectors.

If the number of the valid detection areas is not "1", that is, it is determined that all the detection areas are invalid detection areas in the step S39, in a step S43, by multiplying the coefficient "0.97" to the whole motion vector evaluated one field before, the whole motion vector of the present field in the step S33 is obtained.

Thus, the unintentional motion is corrected by utilizing the whole motion vector according to the number of the valid detection areas. However, a correction method itself is well known, and therefore, a detailed description thereof is omitted here.

In accordance with this embodiment, the determination whether or not there is an object having repeated pattern within the detection areas can be made correctly, and the detection area is not determined as the invalid detection area even if the contrast of the screen is slightly lowered. Therefore, the validation or the invalidation of the detection areas can be correctly determined, and accordingly, the detection accuracy of the whole motion vector improves.

That is, according to the above described embodiment, the disadvantages of the prior art set forth in the following can be eliminated.

In the prior art method wherein the unintentional motion component is detected from the image information, the detection accuracy is largely affected by the status of the input image. Therefore, the propriety of the detected motion vector is evaluated by the microcomputer in accordance with the status of the image.

FIG. 11 is a graph showing a change of a correlative value with respect to coordinate positions in a case where the representative matching method is utilized. Normally, as shown by a solid line a in FIG. 11, the correlative value has a sharp minimum point indicative of the minimum correlative value, and the motion vector is determined on the basis of the position of the minimum correlative value. In contrast, if the contrast of the screen is low, or if a moving object exists in the screen, as shown by a one-dotted line b or a dotted line c in FIG. 11, the minimum correlative value cannot be accurately detected, and therefore, the detection accuracy of the motion vector is lessened. Furthermore, in a case where there is an object having repeated pattern (striped image) in the screen, it becomes very difficult to detect the motion vector. In order to determine the above described image status, in the prior art method, the following conditions are set with respect to the correlative value:

(A) average correlative value>$\alpha$;

(B) value obtained by dividing average correlative value by minimum correlative value>$\beta$; and (C) gradient>$\gamma$ wherein, $\alpha$, $\beta$ and $\gamma$ are constant threshold values, and for example, the same are set as $\alpha=36$, $\beta=7$ and $\gamma=8$.

In the prior art method, for each of the detection areas, it is determined whether or not the above described conditions (A)–(C) are satisfied. Then, if any one of the conditions is satisfied, the detection area is determined as an invalid detection area, and if all the conditions are satisfied, the detection area is determined as a valid detection area. Then, a motion vector is determined by utilizing the motion vectors obtained from the valid detection areas only. As a method for determinating the motion vector, an averaging of the motion vectors of the valid detection areas is utilized, for example.

However, in the above described conditions of the prior art method, if the contrast of the screen is reduced, even when the condition (A) is satisfied, the condition (C) is not satisfied, and therefore, the threshold value $\gamma$ of the condition (C) is to made smaller. However, the threshold value $\gamma$ is made smaller irrespective of the contrast of the screen, it may be erroneously determined whether or not there is an object having a repeating pattern in the screen, and therefore, the detection accuracy of the motion vector is dropped. In contrast, in the above described embodiment, the gradient is compared with the large threshold value or the small threshold value according to another condition, such a problem can be solved.

In addition, in the above described embodiment, the correlative value is calculated through accumulation and addition of the luminance differences. However, the correlative value may be evaluated by utilizing a difference of the electric signals from the solid-state image sensing device 12 between the adjacent fields (frames) instead of the luminance differences.

Furthermore, in the step S31, only one dispersion may be selected, that is, the arbitrary number of dispersions may be selected.

Furthermore, the coefficient utilized in the step S43 is not limited to "0.97", and therefore, an arbitrary coefficient having a value larger than zero but smaller than 1 may be utilized.

Figure 9:
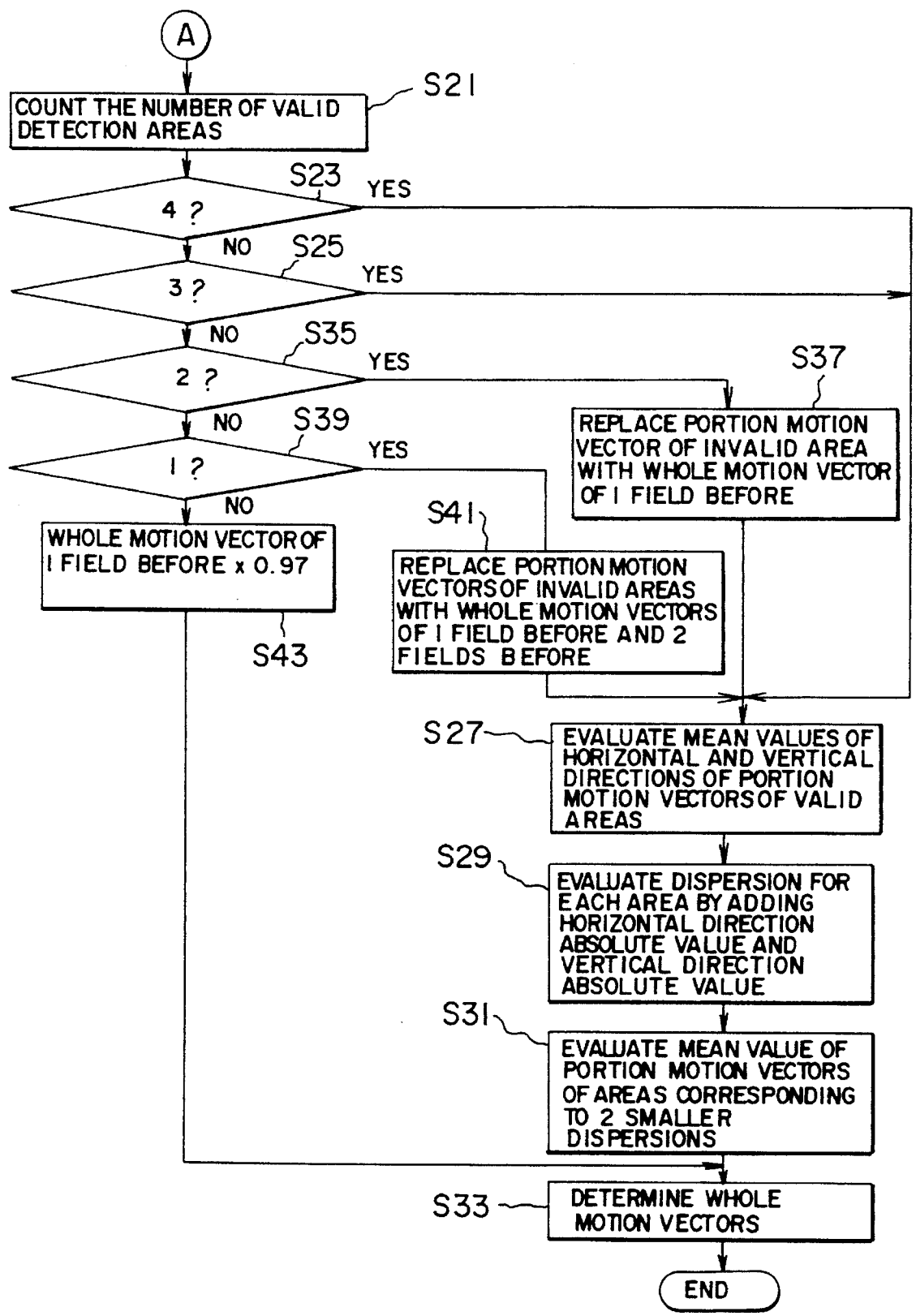
FIG. 9 is a flowchart showing an operation succeeding to FIG. 8.
Figure 10:
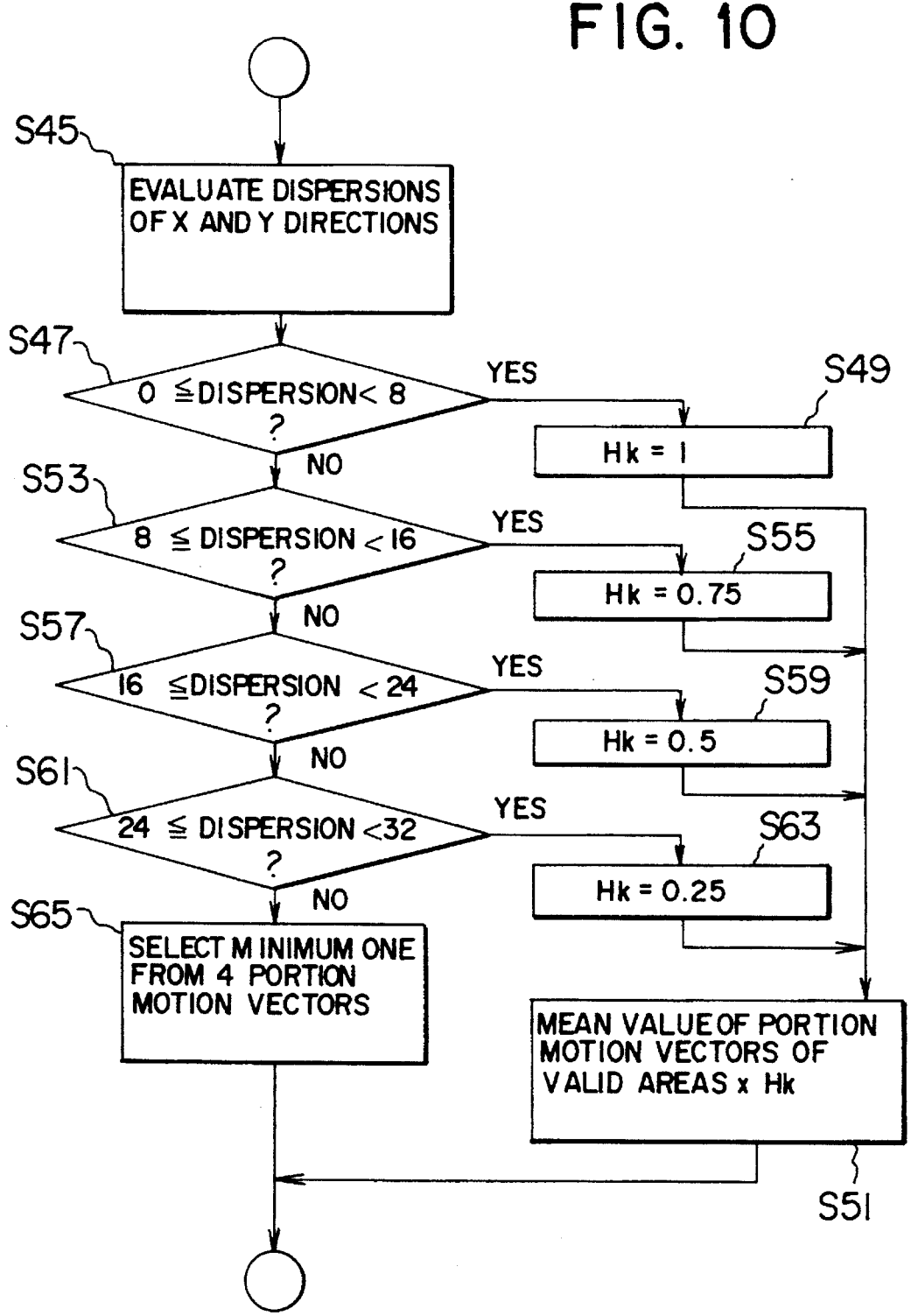
FIG. 10 is a flowchart showing a modified example of an operation for determining a whole motion vector.

Furthermore, instead of the steps S29 and S31 shown in FIG. 9, the processing shown in FIG. 10 may be executed. In this case, after the execution of the step S27 shown in FIG. 9, the process proceeds to a step S45 shown in FIG. 10.

In the step S45, the dispersion is calculated. In calculating the dispersion, the X direction dispersion and the Y direction dispersion are independently calculated as indicated in the above described equations. If $0 \leq$ dispersion$<8$ in a step S47, in a step S49, the dispersion coefficient Hk is set as "1" (Hk=1), and then, the process proceeds to a step S51. If "NO" is detected in the step S47, in a step S53, it is determined whether or not $8 \leq$ dispersion$<16$. If $8 \leq$ dispersion$<16$ in the step S53, in a step S55, the dispersion coefficient Hk is set as "0.75" (Hk=0.75), and then, the process proceeds to the step S51. If "NO" is detected in the step S53, and if $16 \leq$ dispersion$<24$ in a step S57, in a step S59, the dispersion coefficient Hk is set as "0.5" (Hk=0.5), and then, the process proceeds to the step S51. If "NO" is detected in the step S57, and if $24 \leq$ dispersion$<32$ in a step S61, in a step S63, the dispersion coefficient Hk is set as "0.25" (Hk=0.25), and then, the process proceeds to the step S51.

In the step S51, "a mean value of the portion motion vectors of the valid detection areas×Hk" is calculated. The process in the step S51 is performed for the X direction portion motion vectors and the Y direction portion motion vectors, respectively, and in the step S33, the result of the step S51 for the X direction and the result of the step S45 for the Y direction are synthesized with each other, whereby the whole motion vector is obtained.

On the other hand, "NO" is detected in the step S61, in a step S65, a portion motion vector having a minimum value is selected out of the four portion motion vectors, and the same is utilized as the whole motion vector in the step S33 shown in FIG. 9.

In the video camera 10 which operates as shown in FIG. 10, even if moving objects exist in two of the four detection areas such as a left half and a right half of the screen, that is, even if a moving object exists at only a portion of the screen, the influence due to the moving objects becomes small, and therefore, it is possible to determine the whole motion vector with precision.

In addition, irrespective of the valid detection area or the invalid detection area, the whole motion vector which is obtained by multiplying the dispersion coefficient Hk by the average value of the portion motion vectors of the detection areas. This becomes effective for a case where no determination of either the valid detection area of the invalid detection area is performed.

Furthermore, the dispersion may be compared with arbitrary values and the values of the dispersion coefficients are not limited to the above described ones.

Furthermore, the four detection areas are defined within the image field in the above described embodiments. However, the number of the detection areas is arbitrary, and the greater the number of the detection areas, the better the detection accuracy.

Furthermore, in the above described embodiments, the luminance difference is evaluated between the adjacent fields; however, the same may be evaluated between the adjacent frames. Furthermore, the replacement of the whole motion vector and may be performed not a unit on a frame basis rather than on a field basis.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video camera, comprising:

portion motion vector detecting means for detecting a portion motion vector of each of a plurality of detection areas formed in an image field;

valid detection area determining means for determining whether or not each of the detection areas is a valid detection area through determination whether or not each of the portion motion vectors is effective for detecting an unintentional motion of the camera; and whole motion vector detecting means for detecting a whole motion vector in accordance with methods different from each other in accordance with the number of the valid detection area determined by said valid detection area determining means, wherein said whole motion vector detecting means comprises:

first dispersion calculating means for obtaining a first dispersion on the basis of the respective portion motion vectors;

selection means for selecting the arbitrary number of the first dispersions having smaller values; and first detecting means for detecting the whole motion vector on the basis of the portion motion vectors of the detection areas corresponding to the selected first dispersions.

2. A video camera according to claim 1, wherein said first dispersion calculating means comprises:

first calculating means for evaluating a first absolute value representative of a difference between the portion motion vectors in a horizontal direction of each of the detection areas and a mean value of the portion motion vectors in the horizontal direction of the valid detection areas;

second calculating means for evaluating a second absolute value representative of a difference between the portion motion vectors in a vertical direction of each of the detection areas and a mean value of the portion motion vectors in the vertical direction of the valid detection areas; and adding means for obtaining said first dispersion by adding the first absolute value and the second absolute value to each other for each of the detection areas.

3. A video camera according to claim 1 or 2, wherein said first detecting means detects the whole motion vector by averaging the portion motion vectors.

4. A video camera according to any one of claims 1, 2 or 3, wherein the number of the detection areas is four, and said selection means selects two first dispersions.

5. A video camera according to claim 1, wherein said whole motion vector detecting means comprises:

first replacement means for replacing the portion motion vector of the invalid detection area with the whole motion vector before the present field or frame when the number of valid detection areas is less than a predetermined threshold value; and second detection means for detecting the whole motion vector on the basis of the portion motion vector of the invalid detection area being replaced with the whole motion vector and the portion motion vectors of the valid detection areas.

6. A video camera according to claim 5, wherein said first replacement means replaces the portion motion vector of the invalid detection area with the whole motion vector evaluated one field or one frame before.

7. A video camera according to claim 1, wherein said whole motion vector detecting means comprises:

second replacement means for replacing the portion motion vectors of the invalid detection areas with a plurality of whole motion vectors which are different from each other and evaluated before the present field or frame when the number of valid detection areas is less than a predetermined threshold value; and third detection means for detecting the whole motion vector on the basis of the portion motion vectors of the invalid detection areas being replaced with the whole motion vectors and the portion motion vector of the valid detection area.

8. A video camera according to claim 7, wherein said second replacement means replaces the portion motion vectors of the invalid detection areas with the whole motion vectors evaluated one field or frame before and two fields or frames before.

9. A video camera according to claim 1, wherein said whole motion vector detection means includes fourth detection means for detecting the whole motion vector of the present field or frame by multiplying a predetermined coefficient to the whole motion vector evaluated one field or frame before when the number of valid detection areas is zero.

10. A video camera according to claim 9, wherein said coefficient is a numeral value smaller than 1.

11. A video camera according to claim 10, wherein said coefficient is 0.97.

12. A video camera according to claim 1, wherein said valid detection area determining means comprises:

first means for evaluating correlative values of pixels through comparison of an image signal of the last field or frame and an image signal of the present field or frame;

means for evaluating an average correlative value that is a mean value of the correlative values;

means for evaluating a minimum correlative value that is a minimum value of the correlative values;

means for evaluating a value obtained by dividing the average correlative value by the minimum correlative value;

means for evaluating a gradient associated with the minimum correlative value; and means for determining whether or not the portion motion vector is correctly detected in accordance with the following conditions:
(A) average correlative value>first threshold value;
(B) value obtained by dividing average correlative value by minimum correlative value>second threshold value;
(C) gradient>third threshold value (when average correlative value≧fifth threshold value; and
(D) gradient>fourth threshold value (when average correlative value<fifth threshold value), said third threshold value being equal to or larger than the fourth threshold value.

13. A video camera according to claim 1, wherein said whole motion vector detecting means comprises:

second dispersion calculating means for obtaining a second dispersion on the basis of the portion motion vectors;

comparing means for comparing the second dispersion with a predetermined threshold value; and fifth detection means for detecting the whole motion vector by methods different from each other in accordance with a comparison result by the comparing means.

14. A video camera according to claim 13, wherein said second dispersion calculating means comprises:

averaging means for evaluating an average vector that is a mean value of the portion motion vectors; and calculating means for evaluating the second dispersion by adding absolute values of differences between the portion motion vectors and the average vector to each other, and by dividing an addition result by the number of absolute values.

15. A video camera according to claim 14, wherein said portion motion vector detecting means includes means for detecting X direction portion motion vectors and Y direction portion vectors, wherein said averaging means includes means for evaluating an X direction average vector and a Y direction average vector, respectively, and wherein said calculating means evaluates the second dispersion of X direction component of the portion motion vector and the second dispersion of Y direction component of the portion motion vector.

16. A video camera according to claim 13, wherein said comparison means compares a plurality of threshold values with the second dispersion.

17. A video camera according to claim 13, wherein said fifth detecting means comprises:

coefficient setting means for setting a dispersion coefficient in accordance with a comparison result by the comparing means; and means for obtaining the whole motion vector by multiplying the dispersion coefficient to a mean value of the portion motion vectors of the valid detection areas.

18. A video camera according to claim 13, wherein said fifth detecting means includes means for regarding a minimum portion motion vector as the whole motion vector when the second dispersion is larger than a predetermined value.

19. The video camera of claim 1, wherein said portion motion vector detecting means includes:

first means for evaluating correlative values of pixels through comparison of an image signal of the last field or frame and an image signal of the present field or frame, means for evaluating an average correlative value that is a mean value of the correlative values, means for evaluating a minimum correlative value that is a minimum value of the correlative values, means for evaluating a value obtained by dividing the average correlative value by the minimum correlative value, means for evaluating a gradient associated with the minimum correlative value, and means for determining whether or not the portion motion vector is correctly detected in accordance with the following conditions:
(A) average correlative value>first threshold value;
(B) value obtained by dividing average correlative value by minimum correlative value>second threshold value;
(C) gradient>third threshold value (when average correlative value≧fifth threshold value; and
(D) gradient>fourth threshold value (when average correlative value<fifth threshold value), said third threshold value being equal to or larger than the fourth threshold value.

* * * * *